United States Patent

[11] 3,570,690

[72] Inventors Edward F. Wegener;
Thure H. Wegener, River Road, Cranbury South, N.J. 08512
[21] Appl. No. 826,736
[22] Filed Mar. 12, 1969
[45] Patented Mar. 16, 1971
Continuation-in-part of application Ser. No. 609,939, Jan. 17, 1967, now abandoned.

[54] LIFTING AND TOWING APPARATUS
16 Claims, 7 Drawing Figs.
[52] U.S. Cl. ................................................ 214/86,
280/476
[51] Int. Cl. .................................................. B60p 3/12
[50] Field of Search........................................214/86 (A),
330, 334; 280/402, 476, 480; 28/34

[56] References Cited
UNITED STATES PATENTS
3,200,972 8/1965 La Venture .................. 214/86(A)
3,434,608 3/1969 Nelson ........................ 214/86(A)

*Primary Examiner*—Albert J. Makay
*Attorney*—Robert A. Green

ABSTRACT: The tow bar of the invention comprises a rigid combination of bars adapted to be placed in front of a wreck whose wheels are pulled onto the bars by a cable attached to the wreck and guided along the bars. The tow bar and the wheels of the wreck are then raised, and the wreck can then be towed on its other two wheels which remain on the ground.

INVENTOR.
E.F. WEGENER
T.H. WEGENER

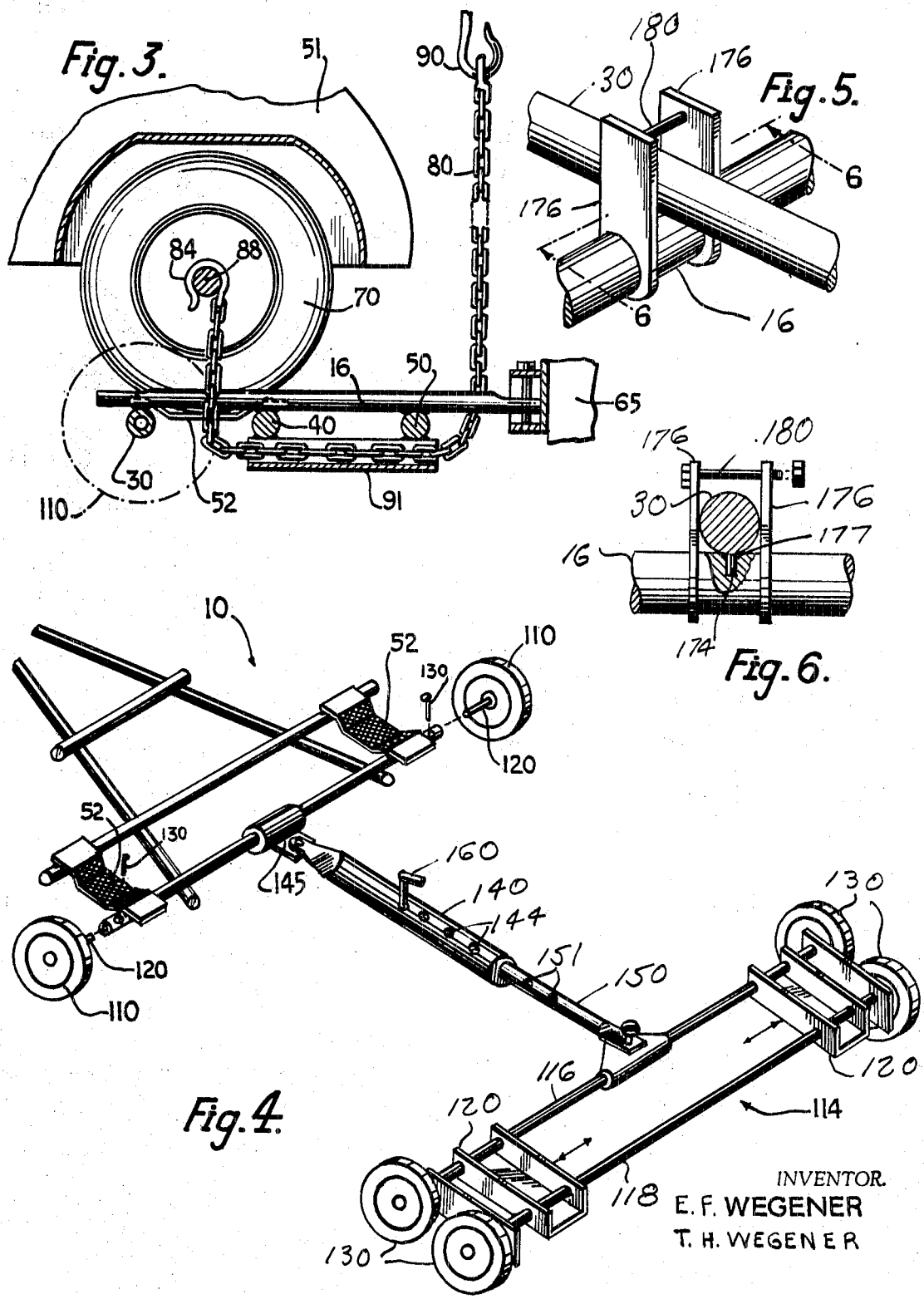

INVENTORS
EDWARD F. WEGENER
THURE H. WEGENER

LIFTING AND TOWING APPARATUS

This Application is a continuation-in-part of application, Ser. No. 609,939, filed Jan. 17, 1967, now abandoned.

BACKGROUND OF THE INVENTION

Apparatus for coupling a tow truck (wrecker) to a vehicle to be towed (wreck) and raising and towing the wreck, is known generally as a tow bar. There are several types of tow bars presently available on the market, and these include means for attaching the tow bar to the frame of the wreck and other means for contacting and cradling the front or rear end of the wreck as it is being raised. Since these two bars actually come into contact with portions of the wreck, precautions must be taken to insure that the tow bar not do further damage to these portions of the wreck, and, at the same time, with some types of tow bars which use leather, rubber or fabric belts, precautions must be taken to prevent jagged portions of the wreck from damaging the tow bar.

Thus, for optimum operation, it is desirable to have a tow bar which is simple in construction, easy to operate, and does not come into contact with portions of the wreck which it can damage or by which it can be damaged.

SUMMARY OF THE INVENTION

Briefly, the tow bar of the invention includes a rigid frame which is hingedly coupled to the wrecker and includes a portion which is adapted to receive and support the front or rear wheels of the wreck. The tow bar also includes means for guiding a connecting cable or lifting chain from the frame of the wreck to the wrecker so that, as a lifting force is applied to the chain, the wreck is brought into contact with the tow bar and it is raised with only its front or rear wheels in contact with the tow bar. The tow bar of the invention may also include auxiliary means for raising the other two wheels of the wreck off the ground and towing the wreck with all four wheels off the ground. In this way, the tow bar of the invention serves as a trailer for the wreck.

DESCRIPTION OF THE DRAWING

In the drawing:

FIG. 3 is a side elevational view of the invention as it appears with a vehicle raised and with a modification of a portion of its structure;

FIG. 4 is a perspective view of a portion of the tow bar of FIG. 1;

FIG. 5 is a perspective view of a modification of a portion of the invention;

FIG. 6 is a sectional view along the lines 6—6 in FIG. 5; and

DESCRIPTION OF THE PREFERRED EMBODIMENTS

Figure 1:
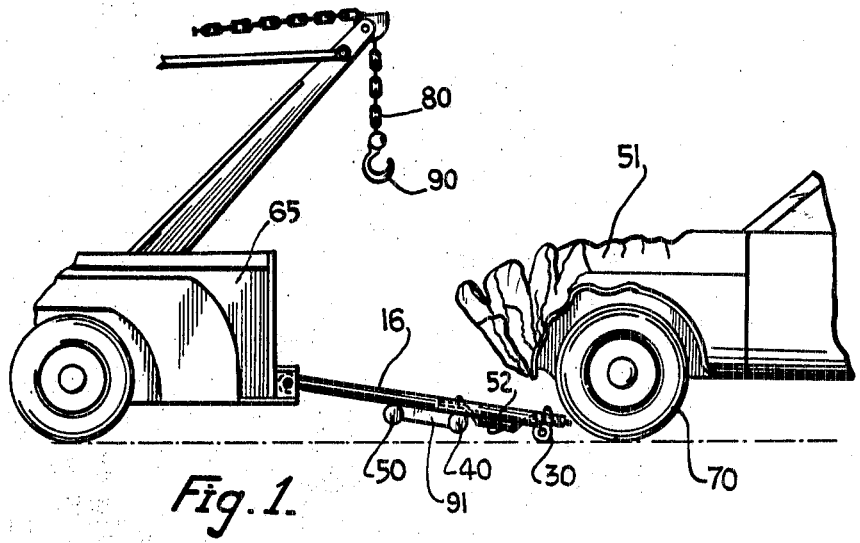
FIG. 1 is a side elevational view of a tow bar embodying the invention as it appears in use.
Figure 2:
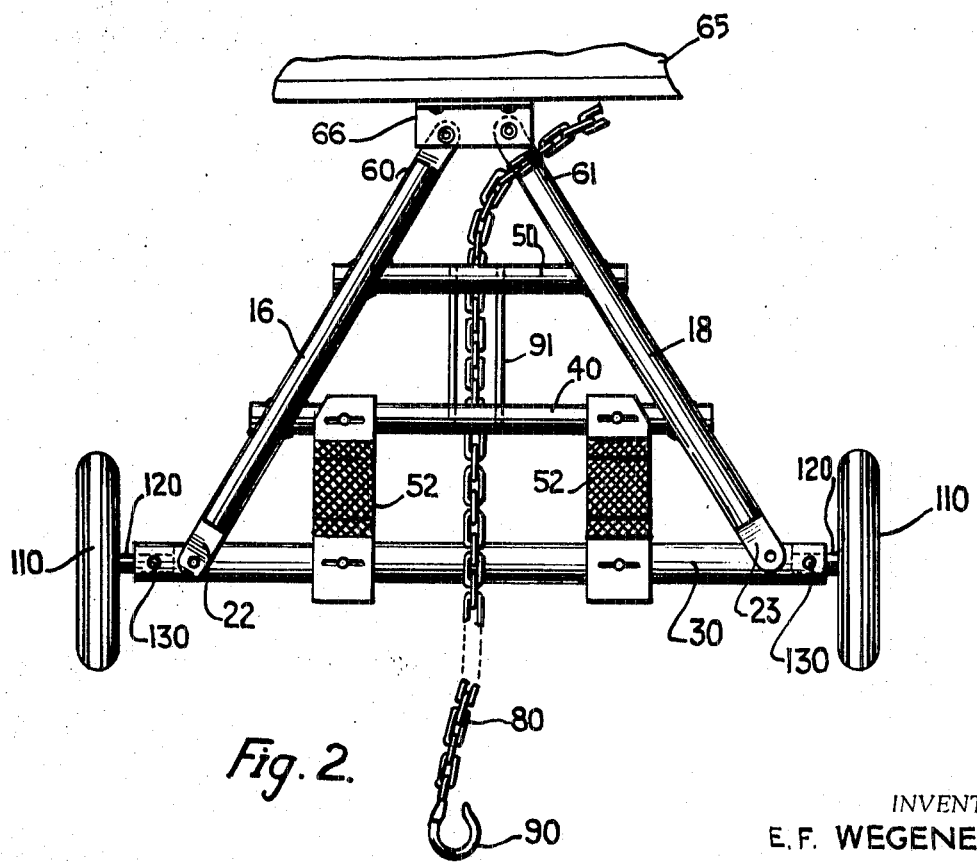
FIG. 2 is a plan view of the tow bar shown in fig. 1.

Referring to FIG. 2, the tow bar 10 embodying the invention comprises a pair of steel tubes or bars 16 and 18 oriented generally in a V-configuration (FIG. 2) with adjacent ends 22, 23 spread apart a suitable distance. These ends of the bars 16 and 18 are welded, bolted or otherwise secured to a first rigid metal tube or bar 30 with the bar 30 beneath bars 16 and 18 as in FIG. 2 or above bars 16 and 18 as in FIG. 4. A second bar or tube 40 is secured to the bars 16, 18 spaced from bar 30 by an amount sufficient to permit the front or rear wheels of a wreck to be supported between them. A third tube 50 is secured to bars 16, 18 between bar 40 and closest to the apex of the V formed by bars 16 and 18. Bar or tube 50 is positioned so that it is oriented in front of and out of contact with the bumper or other body portion of a wreck 51 (FIGS. 1 and 3) during the towing operation which is described below.

Metal plates or trays 52 for receiving the front or rear wheels of a wreck are secured between bars 30 and 40 with suitable spacing between them. The trays 52 may be adjustably secured to bars 30 and 40 to permit adjustment of the spacing between them. If desired, the wheel trays 52 may be omitted, and the wheels of a wreck can be supported between bars 30 and 40 themselves.

The other ends 60, 61 of bars 16, 18 are held together at the apex of the V-configuration and are coupled to the tailgate 64 of a wrecker 65 by means of a suitable bracket 66 which permits the tow bar 10 to pivot in horizontal and vertical planes. Connections of this type are well known in the art.

In operation of the tow bar 10 (FIGS. 1, 2, 3) the bar is positioned with the first tube 30 or the adjacent ends of bars 16 and 18 resting on the ground in front of the wheels 70 of the wreck 51 to be raised and towed. A chain 80, for example, from the wrecker crane, is secured by hook 90 to the frame 88 of the wreck or to an axle, and it is threaded downwardly from the frame between the bars 30 and 40, under and in contact with the second and third bars 40 and 50, and upwardly between bar 50 and the ends 60, 61 of bars 16 and 18. As lifting force is applied to chain 80, the wreck 72 is drawn forwardly until the wheels 70 ride over the first tube 30 and seat between the first and second tubes 30 and 40 on plates 52. As the lifting force is continuously applied to the chain 80, the chain bears against the lower surfaces of the second and third tubes 40 and 50 and raises the tow bar 10 and the wheels of the wreck off the ground. Since the third tube 50 is positioned so that it lies nearer to the wreck than the towing vehicle, preferably just in front of the bumper of the wreck, little strain is applied to the towing vehicle.

If desired, a metal channel member 91 may be secured to the undersurface of the tow bar between the second and third tubes 40 and 50 and perpendicular thereto to serve as a guide for chain 80.

In a modification of the invention also shown in FIG. 2, the ends of bar 30 are adapted to have road-riding wheels 110 secured thereto. In one suitable arrangement, the ends of bar 30 are so constructed that they can receive the axles 120 of wheels 110, with the axles being held in place by pins 130 or the like. Of course, any suitable wheel-coupling arrangement may be used.

In using this modification of the invention, the tow bar 10, without wheels 110 in place, is coupled to a wreck and the wreck is raised as described above. With the wreck raised and with the tow bar 10 raised so that bar 30 is off the ground, the wheels 110 are then attached to bar 30 and the wreck is lowered until the wheels 110 rest on the ground and the wreck is towed in this fashion. This arrangement provides somewhat less strain on the tow bar.

Another modification of the invention shown in FIG. 4 employs the tow bar 10 with wheels 110 secured thereto and, in operation, the tow bar 10 is coupled to the front end of a wreck as described above and with the tow bar wheels 110 on the ground, the rear wheels of the wreck are raised off the ground and a dolly 114 is placed under the rear wheels. The rear wheels of the wreck are then lowered onto the dolly. The dolly includes a pair of shafts 116 and 118 spaced apart and having wheel-supporting trays or pans 120 secured between them. Each shaft also carries a pair of wheels 130 at its ends. With such an arrangement, the wreck is raised completely off the ground and is, in effect, resting on a trailer made up of tow bar 10 and the dolly 114, both parts being rigidly coupled together through the wreck itself.

If desired, the dolly 114 may be physically coupled to the tow bar 10 in any suitable manner. In one arrangement, a hollow tube 140 having a series of locking holes 144, extends rearwardly from a swivel-type connection 145 at about the center of bar 30 of tow bar 10. A mating rod 150 having a plurality of locking holes 151 extends from a swivel connection at about the center of shaft 116 of the dolly and is inserted in the hollow tube 140 to the desired depth. The hollow tube and the mating rod are locked together by a pin 160 inserted through aligned holes in the two members.

One suitable means for connecting bars 30, 40, and 50 to bars 16 and 18 is shown in FIGS. 5 and 6 wherein bar 16 is provided with a pair of spaced apart brackets 176 between which bar 30 is seated. Bar 30 is provided with a guide stud 174 which seats in a hole 177 in bar 16 and a pin 180 is passed through aligned holes in the brackets just above the bar 30 to hold the bar in place.

One advantage of the tow bar 10 is that it can be manufactured as one piece and more or less permanently mounted on a wrecker. The tow bar can also be carried on a wrecker in its separate pieces which can be assembled easily and quickly at the site of operation.

Another advantage of the invention is that it contacts only the wheels of the wreck and there is thus no opportunity of damaging the wreck or the wrecker. In addition, since the wreck can also be raised completely off the ground and carried on a "trailer," long distance hauling of the wreck can now be carried out on highways which previously had not permitted such hauling.

Figure 7:
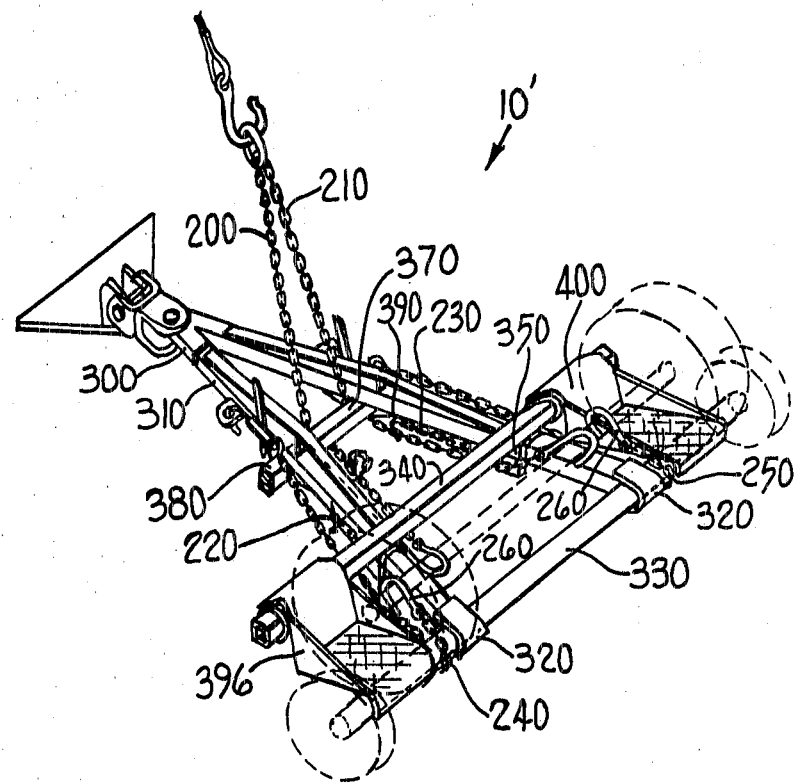
FIG. 7 is a perspective view of a modification of the invention.

The tow bar 10 may conveniently be made so that it can be carried disassembled when not in use and then easily assembled when it is to be used. A collapsible tow bar 10' shown in FIGS. 7 and following has side rails which comprise short lengths of hollow tubing 300 coupled to a suitable common mechanical joint 302 which is mounted on the wrecker. The side rails also include longer lengths of tubing 310 which can be removably inserted into the short lengths of tubing 300. The far end of each elongated tube or side rail 310 remote from the wreck carries a metal U-shaped or O-shaped bracket 320, and the first bar 330 (corresponding to 30) is adapted to be inserted into and supported in these U-shaped brackets. The second bar 340 (corresponding to 40) carries on its lower surface spaced-apart U-shaped brackets 350, each of which is positioned so that it can be slipped over a side rail 310 and locked in place by a pin 360. The third rod 370 (corresponding to 50) is inserted into apertured brackets 380 secured to the lower surfaces of the side rails 310. The tow bar 10' uses wheel-receiving trays 396 and 400 which carry on their lower surfaces hollow tubes suitably spaced apart so they can be slipped onto tubes 330 and 340 and adjusted therein to receive the wheels of a wreck.

It is clear that various modifications may be made in practicing the invention. For example, although one lift chain 80 is described above, as shown in connection with tow bar 10', two lift chains 200 and 210 may be used in the same way as the single chain is used. Somewhat more positive action is achieved with two chains. In addition, auxiliary chains known as snubber chains 220 and 230 are provided coupled between each side rail 16 and 18 and the lift chain adjacent thereto.

The snubber chains 220 and 230 are short lengths of chain, and each has one end secured to one of the U-shaped brackets 350, and its opposite free end carries a grab hook 390 which can be secured to the associated lift chain 200 or 210. The snubber chains are coupled in place immediately after the wheels of the wreck have been pulled onto the trays 396 and 400. The snubber chains are relatively taut when in place, and they operate to limit the pull which the wrecker crane exerts to pull the wheels into the trays. The length of lift chain between the wreck and the grab hook of the snubber is taut and is kept just taut, and there is no further tension due to lifting. Thus, the pressure on the tires of the wreck in the support trays is minimized. This also prevents rearward movement of the wreck off the tow bar and away from the wrecker during towing.

The invention also utilizes a pair of safety chains 240 and 250 which are provided to prevent the wreck from moving forward out of the wheel trays in the relatively unusual case of a sudden panic or emergency stop during towing of the wreck by the wrecker. Each safety chain 240, 250 includes a hook 260 at one end which is hooked over the wreck frame from the rear, and each chain extends from the frame around and under the first bar 330 of the frame and then to a taut connection to a side rail, preferably by means of a load binder 270 or the like which locks the safety chain taut. Each load binder is secured to one of the side rails near the forward ends thereof. It can be seen that the safety chains prevent the wreck from moving forward toward the wrecker while being towed. The safety chains might also be secured to the side rails by means of a grab hook and a suitable receiver therefor on the side rails.

Considering the means for applying pulling and lifting force to the chain(s) which pulls the wreck onto the platform or framework, it is clear that apparatus such as a pulley or sheave might be used to assist in guiding the lift chains from the wreck along the tow bar framework to the wrecker crane. Such a sheave might be mounted on bar 50 (370) or on the wrecker or in any other convenient location.

We claim:

1. A tow bar comprising;
    a rigid framework having a portion adapted to be hingedly connected to a wrecker;
    first means on said framework adapted to be positioned on the ground in front of two wheels of a wreck and adapted to receive and support said two wheels;
    a lift chain adapted to be coupled at one end to a wreck and at the other end to a lifting crane; and
    second means on said framework for guiding said lift chain from said wreck under said framework and through an opening in said framework to a crane whereby lifting forces applied to said chain draw the two wheels of the wreck onto the framework and raise the framework to thereby raise the wheels of the wreck off the ground.

2. The tow bar defined in claim 1 and including a coupling member extending rearwardly from said framework, an auxiliary wheeled assembly secured to said coupling member, said wheeled assembly including channel members for receiving two wheels of a vehicle and its own wheels for rolling along a road surface; and said framework and said auxiliary wheeled assembly comprising, in effect, a four-wheel trailer for completely lifting a vehicle off the road.

3. The tow bar defined in claim 1 and including:
    a coupling member extending rearwardly from said framework;
    an auxiliary wheeled assembly connected to said coupling member with the connection being adjustable to permit adjustment of the spacing between said framework and said wheeled assembly;
    said wheeled assembly including channel members for receiving two wheels of a vehicle and its own wheels for rolling along a road surface; and
    said framework and said auxiliary wheeled assembly comprising, in effect, a four-wheel trailer for completely lifting a vehicle off the road.

4. The tow bar defined in claim 1 and including third means on said platform for securing thereto wheels for supporting the tow bar and the raised end of the wreck on the ground, and a second wheeled assembly supporting the other end of the wreck remote from the tow bar, said second wheeled assembly being coupled to said tow bar to form a trailer.

5. The tow bar defined in claim 1 wherein said first means includes a pair of bars spaced apart to support front or rear wheels of a wreck between them, said lift chain being adapted to extend from the wreck between said bars downwardly under said platform and upwardly through another portion of said platform to provide an arrangement for applying pulling force on said wreck and lifting force on said platform.

6. The tow bar defined in claim 5 an wherein said platform includes a guide channel in which said lift chain lies beneath said platform.

7. A tow bar comprising:
    a first pair of parallel rigid bars spaced apart to support between them a pair of wheels of a wreck to be raised and towed;
    a second pair of rigid bars oriented generally in a V-configuration with the spread-apart portions thereof secured to said first pair of bars to form a rigid assembly;
    the portions of said second bars forming the apex of the V being adapted to be hingedly coupled to a wrecker;

a lift chain; and a third bar secured to said second bars between said first bars and the apex of said V, said third bar being adapted to guide said lift chain from its point of attachment to a wreck and extending between the bars of said first pair in contact with the one bar of said pair of bars to a wrecker for applying a lifting force thereto.

8. The tow bar defined in claim 7 wherein said first pair of bars includes means for securing wheels to one of them whereby said platform may be supported on the ground.

9. A tow bar comprising:

two short lengths of tubing adapted to be coupled to a wrecker body;

elongated lengths of tubing, each removably inserted into one of said two lengths of tubing and having free ends remote from said short lengths of tubing;

a first pair of apertured brackets secured one to the free end of each of said elongated lengths of tubing;

a first bar slidably inserted in said first apertured brackets;

a second bar carrying two spaced-apart brackets, each of which is releasably coupled to one of said elongated lengths of tubing;

second apertured brackets, each secured to one of said elongated lengths of tubing;

a third bar slidably inserted in said second apertured brackets;

a pair of wheel-receiving trays, each having a lower surface to which is secured a pair of hollow tubes; and said hollow tubes being slidably mounted on said first and second bars whereby said trays are positioned between said first and second bars in wheel-receiving position.

10. A tow bar comprising:

a rigid framework having a portion adapted to be hingedly connected to a wrecker;

first means on said framework adapted to be positioned on the ground in front of two wheels of a wreck and adapted to receive and support said two wheels;

a lift chain adapted to be coupled at one end to a wreck and at the other end to a lifting crane; and said framework including structural elements guiding said lift chain along said framework whereby said crane exerts a first force generally horizontally on said lift chain and said wreck to move said wreck toward said framework and to pull said two wheels onto said framework and subsequently a second force generally vertically to raise said framework and said two wheels of said vehicle off the ground.

11. The tow bar defined in claim 10 and including an auxiliary connection coupled between said framework and said lift chain when said front wheels of said vehicle are supported on said framework whereby a horizontal force cannot then be exerted on said vehicle.

12. The apparatus defined in claim 10 and including first auxiliary means coupled to said lift chain to prevent the vehicle from moving forwardly toward the tow truck, and second auxiliary men means coupled between said vehicle and said framework to secure said vehicle in place and prevent it from moving rearwardly away from said tow truck and off said framework.

13. A tow bar comprising:

a pair of rigid bars spaced apart to support between them a pair of wheels of a wreck to be raised and towed;

first means securing said pair of bars together in a rigid assembly and including a portion to be coupled to a wrecker; and said tow bar also including a third bar spaced from said pair of bars and positioned so that it lies generally forwardly of the wreck when the wreck is resting on said pair of bars by two of its wheels, and a flexible lift chain secured at one end to the undercarriage of said wreck and extending therefrom downwardly between said pair of bars and then vertically upwardly along said third bar in contact therewith to the lifting crane of said wrecker whereby said crane acting on said lift chain can exert (1) a horizontal pulling force to pull said wreck onto said pair of bars when said pair of bars are positioned in front of said wheels of said wreck at the beginning of a lifting and towing operation and (2) a vertical lifting force due to the interrelationship between said lift chain and said pair of bars and said third bar whereby said tow bar and the wreck supported thereby are lifted off the ground and thus ready for towing.

14. The apparatus defined in claim 13 and including first auxiliary means coupled to said lift chain to prevent movement of said lift chain in a forward direction and thereby to prevent the wreck from moving forwardly toward the wrecker.

15. The apparatus defined in claim 13 and including a first auxiliary chain coupled to said lift chain and one of said rigid bars to prevent movement of said lift chain in a forward direction and thereby to prevent the wreck from moving forwardly toward the wrecker.

16. The apparatus defined in claim 13 and including first auxiliary means coupled to said lift chain to prevent movement of said lift chain in a forward direction and thereby to prevent the wreck from moving forwardly toward the wrecker, and second auxiliary means coupled between said wreck and one of said bars to secure said wreck in place and prevent it from moving rearwardly away from said wrecker and off said tow bar.